United States Patent Office 3,038,812
Patented June 12, 1962

3,038,812
PROCESS FOR DETECTING INTERIM
THAWING OF EDIBLES
Elliot Berman and Bernard Katchen, Dayton, Ohio, assignors to The National Cash Register Company, Dayton, Ohio, a corporation of Maryland
No Drawing. Filed June 25, 1959, Ser. No. 822,735
15 Claims. (Cl. 99—192)

This invention relates to a process for detecting interim thawing of edibles which must be kept continuously frozen to prevent them from spoiling, and to activatable material adapted to carry out the process.

The process employs material which is lodged with the frozen edibles by being placed thereon, or on the packaging materials holding the edibles, or in the freezing compartment in which they are stored, and which material when activated by ultraviolet light acquires a distinctive color that is maintained as long as the edibles or the freezer, do not reach a temperature above the thawing point for a sufficiently long time to cause the edibles to spoil. If such thawing conditions prevail, the material reverts to the colorless state and will not be restored to the colored state even though freezing conditions be restored.

The activatable material is a chemical compound, or mixtures of compounds, that must be in solution, either in solid solution or in liquid solution, before they respond readily to the ultraviolet light or to the thawing temperatures. In liquid solution, the material may conveniently be contained in microscopic capsules such as those described in United States Patent No. 2,800,457, which issued on the application of Barrett K. Green and Lowell Schleicher on July 23, 1957, to protect the solvent from evaporation and to prevent its escape or migration; or the solution may be a solid and applied as a solid solution residue to the frozen edibles, to the packages containing the edibles, or in or on a tab lodged with the edibles or their packaging, or in the freezing compartment in which the edibles are kept. The capsules may be coated as a liquid slurry on the edibles, on their packages, or on tags to be placed in the freezing compartment. The liquid solution of the material in the capsules is a little faster-responding than the dry solid solution. The liquid vehicle of the slurry, which may contain a binder, preferably is evaporated to leave an apparently dry coating of capsules each containing a liquid droplet.

In the specification, examples of both kinds of solutions will be given. The solid solution may be self-supporting and, if desired, may contain a plasticizer.

Edibles differ as to the temperature at which they may be considered safely refrigerated so as to be kept from spoiling or decomposing, and such temperature safety point is to be considered the thawing point, as there is no precise temperature at which a given edible freezes or thaws, because any edible is made up of many components. By experience it has been determined that —20 degrees centigrade is a fairly safe temperature for most edibles, and most freezers are set to hold the temperature around that point. There are various activatable materials that may be used in the process of this invention, and they may be chosen according to the temperature and time required to cause them to revert to the colorless state, by thawing, after being activated to the colored state. A number of materials, from among many, will be specified as examples of those adapted for use according to the required thawing temperature.

Among the best materials that may be used in carrying out the invention are derivatives of 1,3,3-trimethyl-spiro(2'H-1'-benzopyran-2,2'-indoline) having the structure (I)

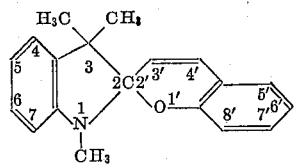

and among these derivatives, all of which are substantially colorless in solution at thawing temperatures and colored when subjected to ultraviolet radiation at freezing temperatures, are those having the substituents 6'-bromo; 7'-chloro; 6'-chloro; 6'8'-dibromo; 6'-methoxy-8'-nitro; 5,6'-dinitro; and 6'-nitro-8'-methoxy.

The 3-phenyl-6-chloro; 8,8'-dimethoxy-3-phenyl-6'-nitro; and 3-phenyl-6'-nitro-8' iodo derivatives of spiro (2H-1-benzopyran-2,2'[2'H-1'-benzopyran]) having the structure (II)

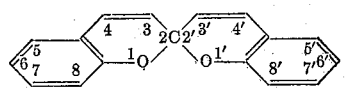

are useful in practicing the invention and are gray-blue in the colored form brought about by radiation with ultraviolet light under freezing conditions and become colorless at thawing temperatures.

The following useful color-forming compounds will be given by structure only, together with their color in the colored form:

(III)

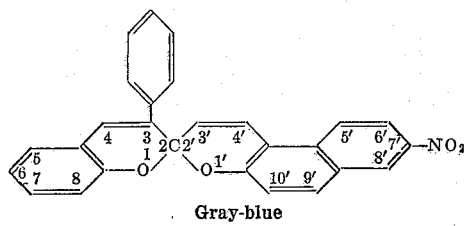

Gray-blue

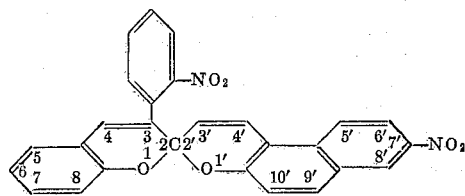

Gray-blue (IV)

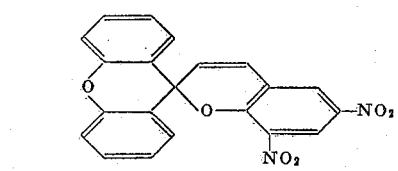

Green (V)

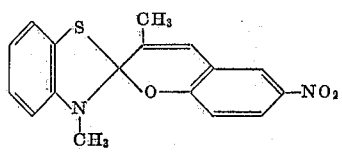

Variable from yellow-orange to red-blue (VI)

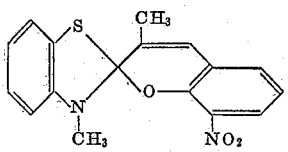

Variable from yellow-orange to red-blue (VII)

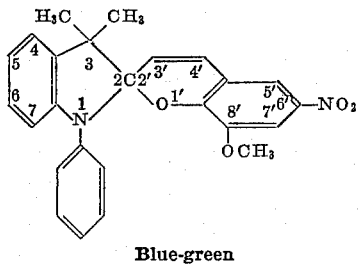

Blue-green

As the preferred embodiment of the invention, one percent, by weight, of the 6'-methoxy-8'-nitro derivative of 1,3,3-trimethyl-spiro (2'H-1'-benzopyran-2,2'-indolene), which is the Compound I, is dissolved in chlorinated diphenyl of 60 percent, by weight, chlorine content, and micro-encapsulated according to the disclosure in the mentioned United States Patent No. 2,800,457, as follows: twenty grams of gum arabic is dissolved in 160 grams of water and emulsified with 80 grams of the chlorinated diphenyl solution. This emulsion is mixed with a sol made of 20 grams of pigskin gelatin, with its iso-electric point at pH 8, and 160 grams of water. The pH of the mixture of colloids and oil is about 4.5 and is adjusted to 5. Next, 500 grams of water is introduced into the mixture, and the pH is slowly adjusted back to 4.5, which is in the complex coacervate range. Ten percent acetic acid in water may be used for this pH adjustment. The 500 grams of water is a variable item, and, therefore, a larger or smaller amount may be used, depending on the oil drop size and the final aggregate size that is desired. In general, the larger the oil drop size the more water is needed, and the less water used the smaller will be the size of the capsule aggregates.

In all of the foregoing steps, the ingredients are kept at 50 degrees centigrade, and the mixture is being continuously agitated, but not so much so as the cause foaming. By adjusting the pH back to 4.5, the mixture is taken into the complex coacervate region, and the complex colloid is deposited around the oil droplets. To harden the capsules—that is to say, to harden the encapsulating material—3½ grams of 37% formaldehyde in water is added to the mixture with agitation. This last step of adding the formaldehyde is also done with the ingredients kept at 50 degrees centigrade. In order to complete the hardening action, a subsequent pH adjustment after gelation is necessary to bring the mixture to the alkaline side.

The mixture is next gelated by lowering the temperature to 10 degrees centigrade during a thirty-minute interval, with agitation, whereupon the complex encapsulating material forms a gel within which the oil droplets remain fluid. After this, the pH is adjusted to 9 with a 20% solution of sodium hydroxide in water. Sodium carbonate may be substituted for the sodium hydroxide, if desired. The result is a slurry of microscopic capsules containing the activatable material in solution, and such slurry may be coated on the edibles or on the packages thereof, or on tabs, and dried. This material may then be activated by being subjected to ultraviolet light, whereupon it turns green, which will persist at room temperature (20 degrees centigrade) for about one minute. It is best to activate the capsular material under freezing conditions to prevent premature reversion to the colorless form. A piece of absorbent paper dipped in the slurry of capsules, and dried to eliminate the formation of ice thereon and consequent concealment of the capsular contents, may be subjected to the ultraviolet light and placed in the freezing compartment, or the slurry may be coated on the edibles or on the packages thereof and activated, preferably when dry. Other of the compounds mentioned may be used in substitution for or mixed with that specified as the preferred compound, each compound contributing its own characteristics to the mixture. If desired, the capsules may be filtered out of the water and dried to form a dry powder which may be placed in a container, such as a transparent bag or bottle, which may be lodged with the edibles, and this may be subjected to the ultraviolet radiation, to be activated thereby.

As a second example, several percent, by weight, of any of the specified compounds, or mixtures of them, may be dissolved in ethanol and placed in transparent closed vials, which may be irradiated under freezing conditions and placed in the freezing compartment. Inasmuch as the freezing point of ethanol is −117 degrees centigrade, no freezing of the solution will occur in the vial, and it may be inspected from time to time for evidence of interim thawing. Any solvent for the activatable compounds may be used and, if not evaporable, may be left in an open container or absorbed in an absorbent carrier such as filter paper, blotting paper, or cloth.

As a third example, the activatable material is mixed with cellulose butyrate with the aid of a mixture of toluene, ethanol, and acetone, all of which are evaporable, and cast or coated to form a film or thicker sheet, which becomes solid after evaporation of the evaporable components. Specifically, one percent, by weight, of the 6'-methoxy-8'-nitro derivative of Compound I is dissolved in a mixture of 750 grams of cellulose butyrate, 750 grams of chlorinated diphenyl (60 percent chlorine content), and 960 grams of toluene, 240 grams of ethanol, and 300 grams of acetone. This is applied as a dryable coating or cast into a solid sheet, to be used as described. Other film-forming solvents for the activatable material are polyvinyl alcohol, polyvinyl acetate, polyvinylmethylether maleic anhydride copolymer, polyethylenemaleic maleic anhydride copolymer, polyvinyl butyral, polyethylene, ethyl cellulose, and regenerated cellulose ("cellophane").

All of the products described as examples are activatable by being subjected to strong electromagnetic radiation predominating in wave lengths shorter than 4,000 A., and the activation preferably is carried on at freezing temperatures.

Other compounds are known that have the property of being colored when subjected to ultraviolet light at food-freezing temperatures and reverting to the colorless form at food-thawing temperatures in the absence of ultraviolet light, among which are the fulgides and leucocyanides of triphenyl-methane dyes, but such compounds are not so responsive as those specified as preferred. However, no claim is made to any such compound per se, in this application.

While the invention has been described in several different forms and a preferred form indicated, it is of broad significance and should not be deemed limited to the specific examples cited, and, therefore, the invention will be claimed to include materials equivalent to those specifically named.

What is claimed is:

1. A process for detecting the interim thawing of supposedly continuously frozen edibles, including the step of subjecting to ultraviolet radiation a substantially colorless solution of a material which turns to a distinctive color when subjected to ultraviolet radiation and which stays colored unless subjected to thawing temperature; and the step of lodging such a colored solution in the same environment in which the supposedly frozen edibles are stored, whereby a later observation detecting by the color of the solution whether thawing has occurred during the interim, a colorless state of the solution indicating that a thawing has occurred.

2. A process for detecting the interim thawing of supposedly continuously frozen edibles, including the step of subjecting to ultraviolet radiation a substantially colorless liquid solution of a material which turns to a distinctive color when subjected to ultraviolet radiation and which stays colored unless subjected to thawing temperature; and the step of lodging such a colored solution in the same environment in which the supposedly frozen edibles are stored, whereby a later observation detecting by the color of the solution whether thawing has occurred during the interim, a colorless state of the solution indicating that a thawing has occurred.

3. A process for detecting the interim thawing of supposedly continuously frozen edibles, including the step of subjecting to ultraviolet radiation a substantially colorless solid solution of a material which turns to a distinctive color when subjected to ultraviolet radiation and which stays colored unless subjected to thawing temperature; and the step of lodging such a colored solution in the same environment in which the supposedly frozen edibles are stored, whereby a later observation detecting by the color of the solution whether thawing has occurred during the interim, a colorless state of the solution indicating that a thawing has occurred.

4. A process for detecting the interim thawing of supposedly continuously frozen edibles, including the step of subjecting to ultraviolet radiation a substantially colorless liquid solution of a material contained as microscopic droplets in translucent microscopic capsules, which solution turns to a distinctive color when subjected to ultraviolet radiation and which stays colored unless subjected to thawing temperature; and the step of lodging such a colored solution in the same environment in which the supposedly frozen edibles are stored, whereby a later observation detecting by the color of the solution whether thawing has occurred during the interim, a colorless state of the solution indicating that a thawing has occurred.

5. The process of claim 1 in which the solution includes a non-evaporable solvent and is absorbed on a tag of absorbent material and the tag bearing the solution is lodged with the frozen edibles.

6. The process of claim 1 in which the solution is the dried residue of a solid solvent for the material, an evaporable liquid solvent for both the solid solvent and the material, and the material.

7. The process of claim 1 in which the solution is a self-supporting film which is the dried residue of a solid film-forming solvent for the material, an evaporable liquid solvent for both the solid solvent and the material, and the material.

8. A process for detecting interim thawing of edibles which are frozen and which are required to be kept frozen without intervals of thawing, in order to prevent spoilage thereof, including the steps of lodging with the frozen edibles a solution of a chemical compound which has a colorless state at thawing temperature and above, and a colored state brought about by subjecting the solution to ultraviolet light, said solution in the colored state reverting to the colorless state when raised to thawing temperature and not returning to the colored state even though freezing temperature is resumed, unless again subjected to ultraviolet radiation; and subjecting the solodged solution to ultraviolet light to color it, whereby a later observation detecting by the color of the solution whether thawing has occurred during the interim, a colorless state of the solution indicating that a thawing has occurred.

9. The process of claim 8 in which the solution is a liquid.

10. The process of claim 8 in which the solution is a liquid contained as microscopic droplets in translucent microscopic capsules.

11. The process of claim 8 in which the solution includes a non-evaporable solvent and is absorbed on a tag of absorbent material and the tag bearing the solution is lodged with the frozen edibles.

12. The process of claim 8 in which the solution is the dried residue of a solid solvent for the material, an evaporable liquid solvent for both the solid solvent and the material, and the material.

13. The process of claim 8 in which the solution is a self-supporting film which is the dried residue of a solid film-forming solvent for the material, an evaporable liquid solvent for both the solid solvent and the material, and the material.

14. A package of edibles adapted to be frozen, said package having thereon a solution of a material which is normally colorless but which turns to a colored state when subjected to ultraviolet light and stays colored when maintained at freezing temperatures but reverts in a short time to the colorless state if raised to thawing temperature, whereby by subjecting the package to ultraviolet light the solution is activated and will stay colored if subjected to freezing temperature before reversion to the colorless form.

15. A frozen package of edibles having therewith a solution of material which normally is colorless but which becomes colored when subjected to ultraviolet light and remains colored when maintained at freezing temperatures but reverts to the colorless state when raised to thawing temperatures and will not become colored if again subjected to freezing temperatures unless subjected to ultraviolet light, the solution on said frozen package having been subjected to ultraviolet light so the solution is colored.

References Cited in the file of this patent

UNITED STATES PATENTS

| | | |
|---|---|---|
| 2,676,887 | Chalkley | Apr. 27, 1954 |
| 2,735,783 | Tamblyn et al. | Feb. 21, 1956 |

OTHER REFERENCES

Bloch-Chaude: Compt. rend., Acad. Sci. 240, March 1955, pages 1426–8.

Hirschberg: Jr. Am. Chem. Soc. 78, 1956, pp. 2304–2312.